Sept. 8, 1970 K. H. JOHNSTON 3,527,336
GUIDE RAIL SYSTEM
Filed Feb. 28, 1968 3 Sheets-Sheet 1
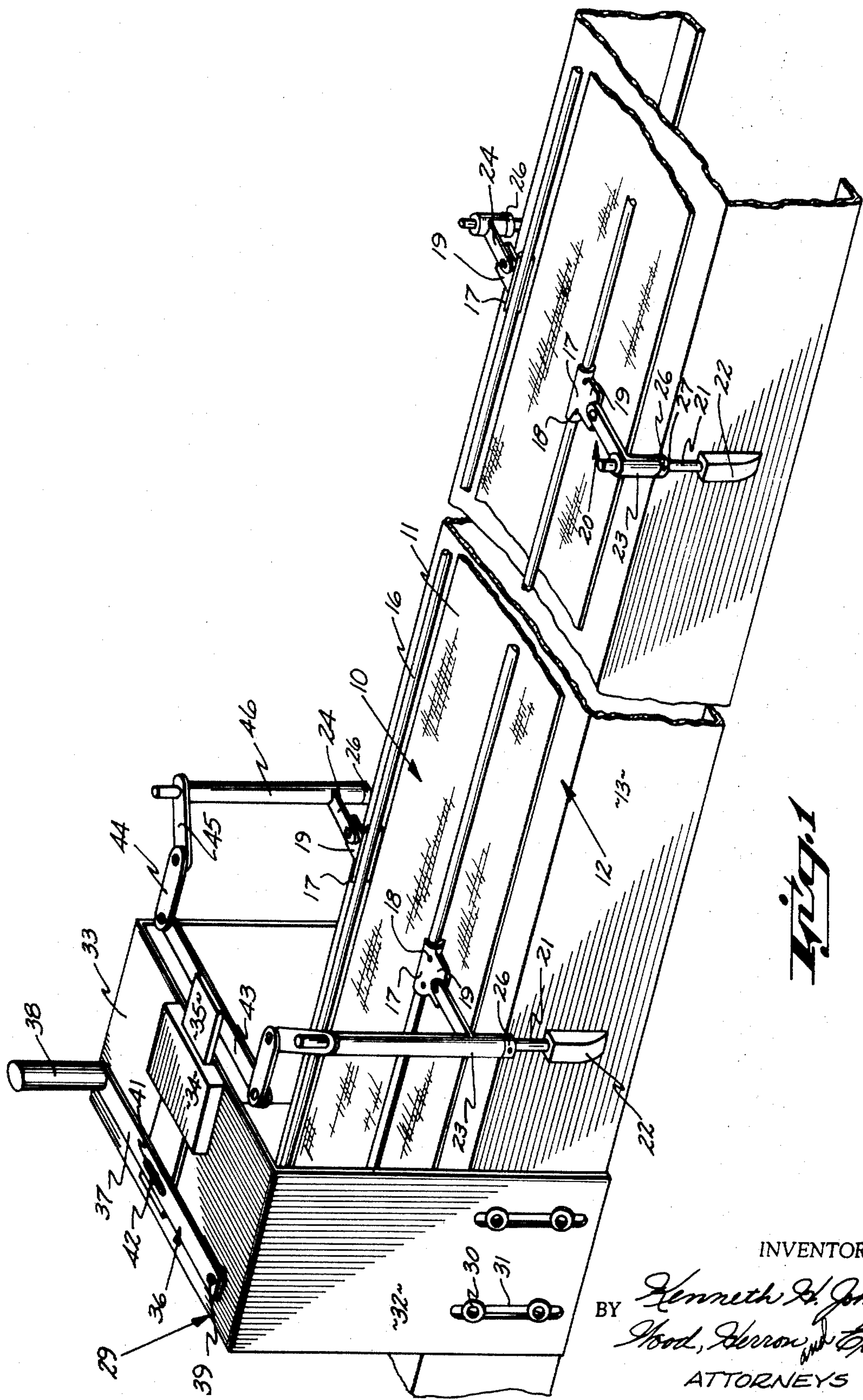
INVENTOR.
BY Kenneth H. Johnston
Wood, Herron and Evans
ATTORNEYS

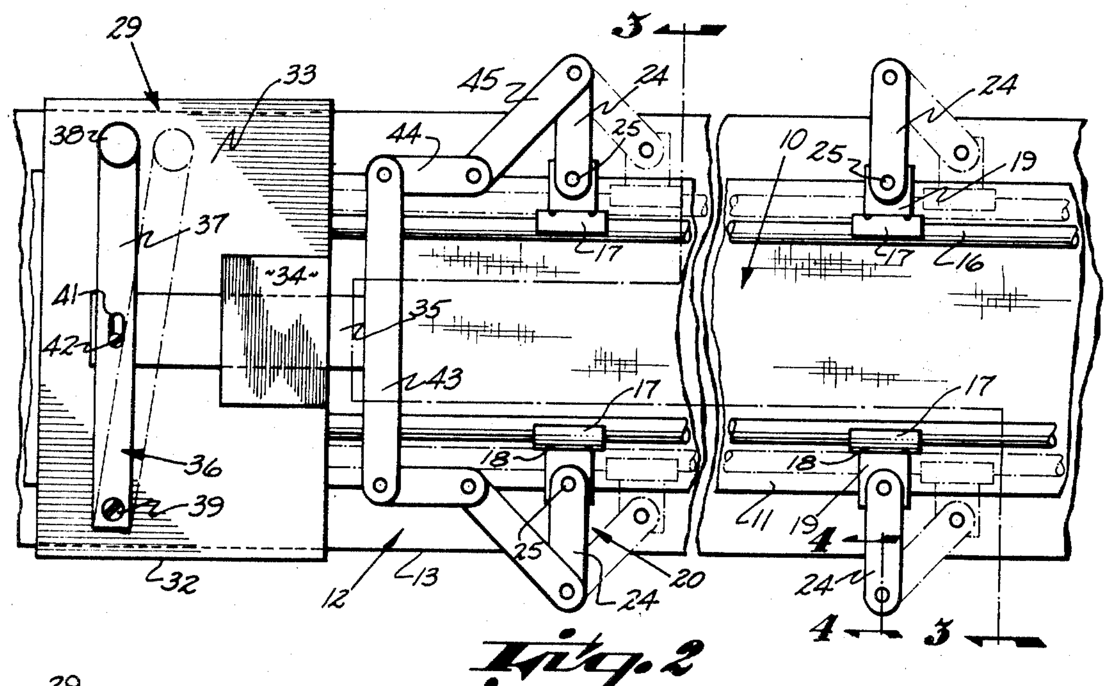
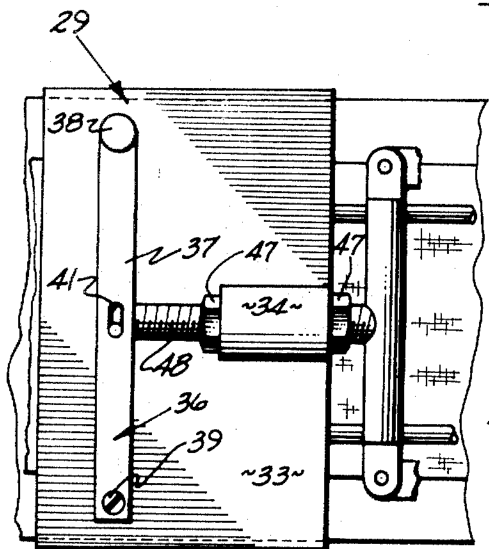
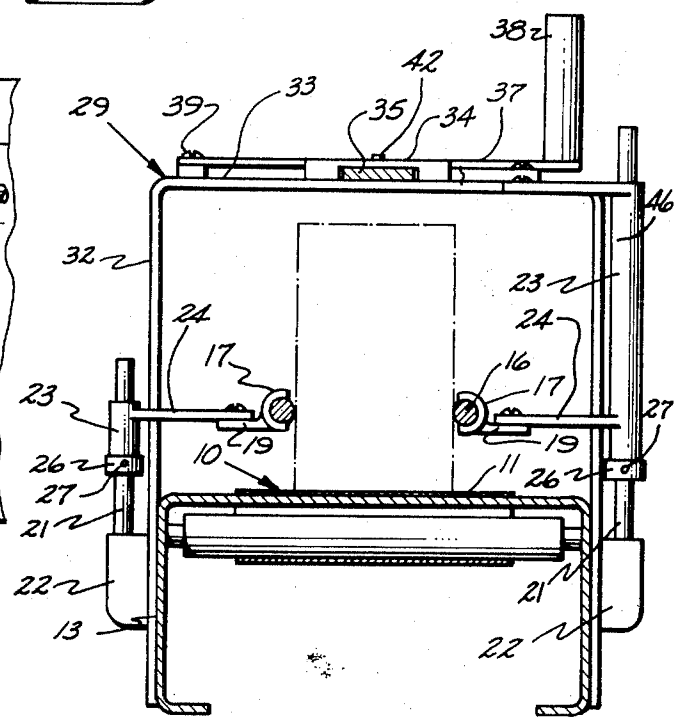
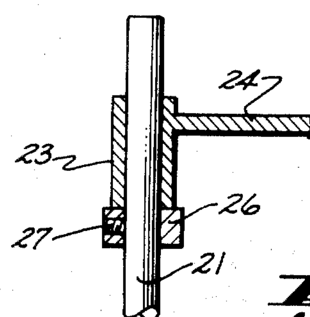
INVENTOR.
Kenneth H. Johnston
BY Hood, Hervon and Evans
ATTORNEYS Sept. 8, 1970 K. H. JOHNSTON 3,527,336
GUIDE RAIL SYSTEM
Filed Feb. 28, 1968 3 Sheets-Sheet 3
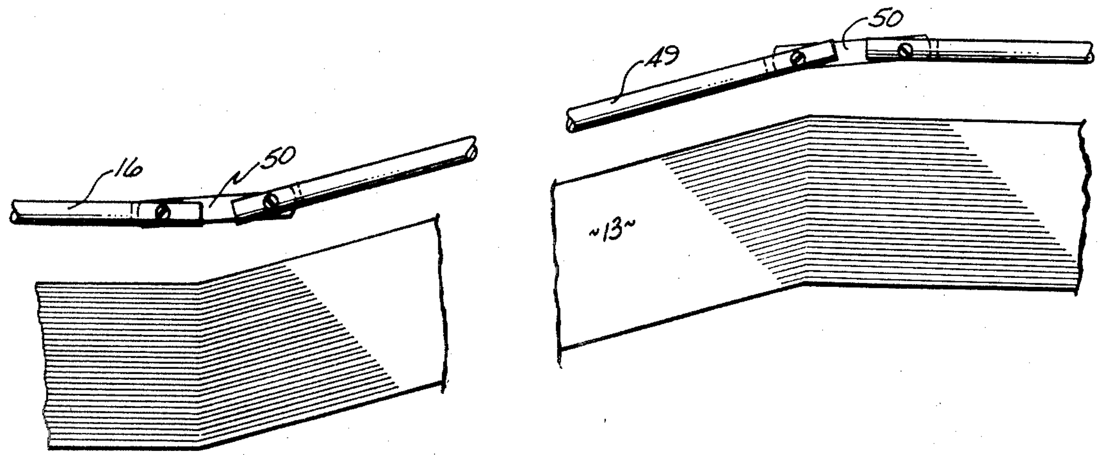
Fig. 6
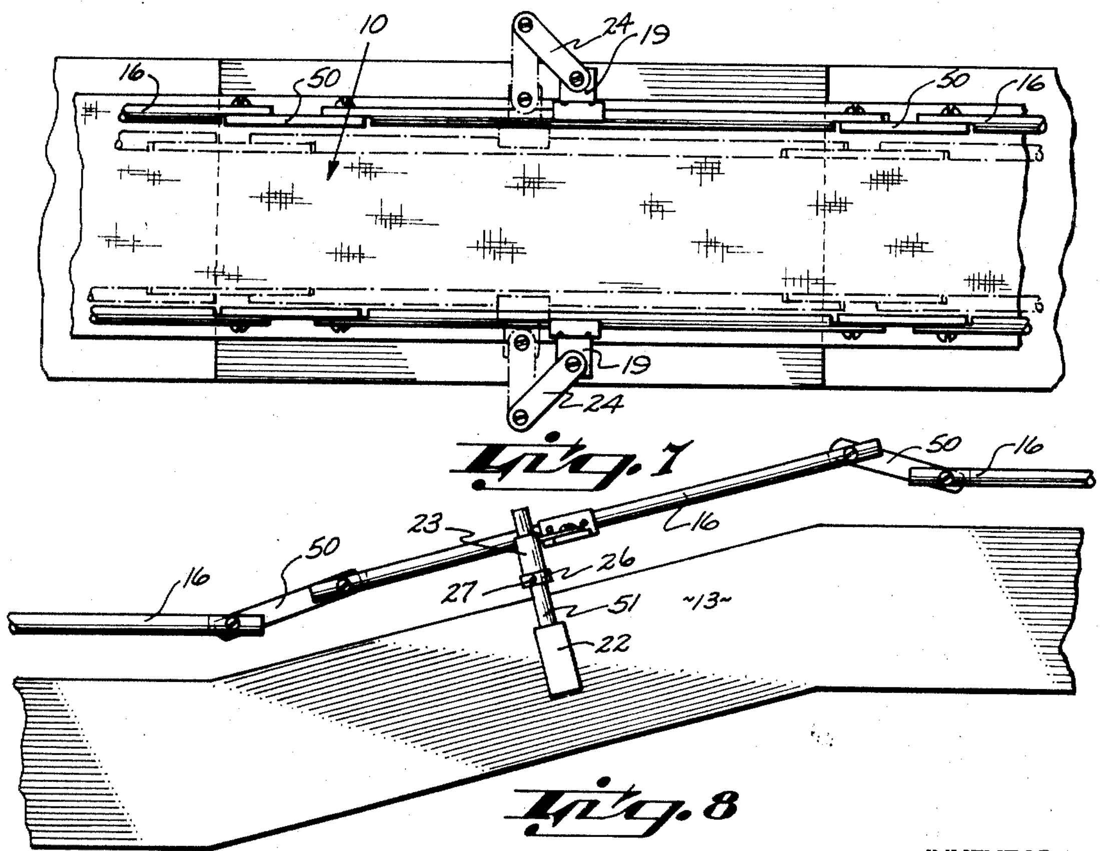
Fig. 7
Fig. 8
INVENTOR.
Kenneth H. Johnston
BY Hood, Herron and Evans
ATTORNEYS

United States Patent Office 3,527,336

Patented Sept. 8, 1970

1

3,527,336

GUIDE RAIL SYSTEM

Kenneth H. Johnston, Cleves, Ohio, assignor to Associated Millwrights, Inc., Cincinnati, Ohio, a corporation of Ohio Filed Feb. 28, 1968, Ser. No. 708,883

Int. Cl. B65g *15/46*

U.S. Cl. 198—137 4 Claims

ABSTRACT OF THE DISCLOSURE

A guide rail system for use with conveyors that is readily adaptable to varying width packages comprising, in preferred form, (a) two guide rails, one on each side of a conveyor path, (b) at least two posts for supporting each guide rail, and (c) linkage means interconnecting each guide rail with its respective posts for varying simultaneously and equally the distance of each guide rail from all its support posts.

This invention relates to a guide rail system that is particularly adapted for use with conveyors.

Generally speaking, a conveyor is defined as a materials handling machine that moves its load over a fixed horizontal, declined and/or inclined path. Such machines are designed to move individual articles over the desired path of travel with either continuous or intermittent motion. Conveyors may be broadly classed into two primary groups, namely, gravity conveyors where the actuating force for moving an article along the conveyor is the force of gravity and powered conveyors where the actuating force may be compressed air suction, vibration, or various drives such as continuous belts, chains, or cables. Gravity conveyors typically include those of the sliding friction type, for example, chutes, and those of the rolling friction type, for example, skate wheels. Powered drive conveyors typically include those of the continuous belt type, for example, a fabric or woven mesh belt, and those of the chain type, for example, a push bar or cleat chain.

Of course, it is very well known that such conveyors are widely used throughout industry to economically and efficiently handle a myriad of different types of products when moving those products from one location to another. Whether a gravity or powered conveyor is utilized, the conveyor is oftentimes provided with guide rails of one type or another to insure that the product being conveyed does not inadvertently fall from or get pushed off the conveyor path. Guide rails are useful not only on horizontal travel sections of a conveyor path, but are also extremely useful when the conveyor path is inclined or declined. Guide rails known to the prior art are generally mounted in a permanent manner with a rail being positioned on each side of the conveyor path, for example, on each side of a conveyor belt. Typically, such guide rails may run ten feet, twenty feet, forty feet or more in length and, of course, intermediate that length a series of support posts is provided to establish and maintain structural rigidity for each guide rail. However, generally the guide rail and related support posts are rigidly mounted together, for example, by welding, so that there is absolutely no possibility of varying the width between guide rails on opposite sides of a conveyor path. Thus, different size packages have to be moved on a conveyor path between guide rails that cannot be adjusted widthwise to compensate for the different widths of those packages.

The major object of this invention has been to provide a guide rail system primarily adapted for use with conveyors that easily and simply permits the distance between the guide rails on opposite sides of a conveyor path

2 to be varied by a single operator working from a single position along an extended length guide rail system.

This object has been attained by providing a guide rail system readily adaptable to varying width packages that comprises, in preferred form, (a) two guide rails, one on each side of a conveyor path, (b) at least two posts for supporting each guide rail, and (c) linkage means interconnecting each guide rail with its respective posts for varying simultaneously and equally the distance of each guide rail from all its support posts.

Other objectives and advantages will be more apparent from the following detailed discription taken in conjunction with the drawings in which:

FIG. 1 is a perspective view of a guide rail system on a horizontal conveyor path constructed in accordance with this invention;

FIG. 2 is a top view of the apparatus illustrated in FIG. 1;

FIG. 3 is a cross-sectional view taken along lines 3—3 of FIG. 2;

FIG. 4 is a cross-sectional view taken along lines 4—4 of FIG. 2;

FIG. 5 is a top view of an alternative embodiment for a portion of the guide rail system;

FIG. 6 is a side view illustrating the guide rail system on an inclined conveyor path in its narrow width position;

FIG. 7 is a top view of the system illustrated in FIG. 6; and

FIG. 8 is a side view similar to FIG. 6 illustrating the guide rail system in an intermediate width position.

The guide rail system of this invention is illustrated in conjunction with a powered conveyor of the continuous belt type, however, it will be understood that the guide rail system can be used with substantially any type conveyor known to the art where guide rails are beneficial. As illustrated in FIG. 1, the conveyor 10 provides a conveying surface or conveyor path in the form of a continuously moving belt 11. The belt 11, and its drive mechanism (not shown), is suitably supported on a housing 12 having opposed sides 13.

The guide rail system of this invention includes two opposed guide rails 16, one positioned on each side of the conveyor path defined by the belt 11. Although the rails 16 are illustrated as rods, it will be understood that any other geometrical guide rail configuration such as, for example, flat bars, may be used in accordance with the principles of this invention. The guide rails 16 may be of any desired length that is consistent with practical construction limitations. If an extra long conveyor path is present, for example, over about one hundred feet in length, it may be desirable to place two guide rail systems in series for practical application purposes.

Each guide rail 16 is supported in position relative to the conveyor belt 11 by support or footing means in the form of posts 21, the guide rail and the posts being connected by linkage means 20. The posts 21 are mounted to the sides 13 of the conveyor housing 12, each post 21 being carried in a base 22 that is permanently mounted to the side 13 of the housing 12. Although only two posts 21 are shown supporting the guide rail 16 on each side of the conveyor path, it will be understood that a series of such supports with accompanying linkage means 20 may be provided for each guide rail as required to establish structural rigidity for the system. Such requirements for additional posts 21 will primarily depend on the overall length of the guide rail.

As mentioned, linkage means 20 is provided to interconnect each post 21 with its respective guide rail 16, the linkage means 20 in this preferred embodiment comprising (a) a rail holder 17 with integral flange 19 and (b) a collar 23 with integral collar link 24. The linkage means 20 permit each guide rail 16 to move simultaneously along its extended length an equal distance from all its support posts 21 in a direction transverse to the conveyor path 11. The guide rail 16 is retained in each rail holder 17 by set screws 18, the holders being positioned along the rail so all flanges 19 extend outwardly away from the conveyor belt 11 when the rail is in final position. Each collar 23 is carried on a separate post 21 and each collar link 24 is pivotaly mounted, as at 25, to a rail holder flange 19, thereby interconnecting the guide rail 16 with each post 21. Each collar 23 is of an inside diameter that permits easy rotation of it about its respective post 21. A height adjusting ring 26 is positioned beneath each collar 23 to provide means for locating the collar at varying heights on its post 21, thereby positioning the guide rail at varying heights relative to the conveyor belt 11. Each ring 26 is provided with a set screw 27 so that it may be immobily held on its related post 21 at the desired height and act as a bearing block for the collar 23. Thus, each collar 23 is freely rotatable relative to its respective post 21 and, through its collar link 24, is pivotably connected to its associated guide rail 16.

As the collars 23 are rotated by manual means or by motive means to be subsequently described, and because the collars are all themselves interconnected through the guide rails 16, the distance or width between the guide rails narrows or widens relative to the conveyor belt 11. That is, the distance between each guide rail 16 and its associated support posts 21 narrows or widens as the collars 23 rotate because of the linkage means 20 structure. The maximum width variation that the guide rail system of this preferred embodiment possesses, as illustrated in FIG. 1, is about equal to twice the length of one of the collar links 24 because both guide rails 16 move simultaneously, and both move an equal distance in either the narrowing or widening direction, when the system is actuated.

One of the main advantages of this guide rail system is that, at a single position along an extended guide rail length, each guide rail may be easily and simply varied in distance between its associated support posts 21 all at once along its entire length by only one operator. This positioning and repositioning of each guide rail can be accomplished manually, but motive means is preferably provided in combination with and for the purpose of actuating the linkage means. The motive means includes a bridge 29 that is permanently connected to the sides 13 of the conveyor housing 12 by screws 30. The bridge 29 is vertically adjustable through slots 31 in each side 32 of the bridge cooperating with the screws 30. The top 33 of the bridge 29 carries a guide block 34 and a slide bar 35 movable relative to the guide block along the center line of the conveyor path or belt 11. One end of the slide bar 35 is connected to a crank 36 on its crank arm 37 at a position intermediate the crank handle 38 and point 39 where the arm is pivotably mounted to the bridge 29. A slot 41 is provided in the arm 37 through which a screw 42 retains the crank arm 37 in operable engagement with the slide bar 35. Thus, as the crank 36 is rotated clockwise or counterclockwise the slide bar 35 is moved forwardly or rearwardly through the guide block 34.

The other end of the slide bar 35 is mounted to a connector bar 43 extending transversely across the conveyor belt 11. Each end of the connector bar 43 is interconnected, by a coupling link 44, to a drive link 45 permanently mounted to an extended length collar 23 in the form of a drive collar 46. Each drive collar 46 is rotatably carried on its respective post 21 and is supported on that post by a ring 26. Each ring 26 is adjustable to vary the height of each drive collar 46 on its post 21 and is provided with a set screw 27 to retain the ring in position on the post. Each coupling link 44 is pivotally mounted to both its drive link 45 and the connector bar 43 so that, as the slide bar 35 is moved axially by rotating the crank 36, the drive collars 46 rotate on their posts 21.

In operation, and with use of the motive means described above, the distance or width between two guide rails 16, one on each side of the conveyor belt 11, can be varied a total distance substantially equal to twice the length of one collar link 24, that is, about twice the distance from a collar 23 to a pivot point 25, thereby permitting the guide rail 16 to be conformed to the width of different width packages 50 (as shown in phantom lines in FIG. 3) passing along the conveyor belt 11, see FIG. 3. As illustrated more particularly in FIG. 2, when the crank 36 is moved from a position illustrated in solid lines to a position illustrated in phantom lines, that is, when the crank is moved clockwise, each guide rail 16 is moved an equal distance outwardly from the conveyor belt 11 center line to that position illustrated in the phantom lines. This is because the slide bar 35 moves in the same vertical plane as the conveyor path center line, that is, the slide bar is positioned equidistant from opposing side rails 16. As the slide bar 35 is moved to the right in FIG. 2 the drive link 45 causes the drive collars 46 to rotate and this motion is transmitted to guide rails 16. The guide rails 16 move forwardly and outwardly because the collards 23 rotate and because the collar links 24 are pivotally mounted to the rail holders 17. This apparatus permits an infinity of widths to be established for opposed guide rails 16 between the maximum and minimum limits as established by the length of the colar links 24. Thus, with a single operator the guide rail system can be readily adapted for and conformed widthwise to the many different size package widths that the conveyor belt 11 may be required to move. In FIGS. 1, 2, 3 and 5, the crank 36 for the guide rail system is illustrated as being manually operable. However, it will be understood that the linkage means 20 or slide bar 35 can be pneumatically or hydraulically actuated if so desired.

An alternative embodiment of the slide bar 35-guide block 34 structure is illustrated in FIG. 5 wherein the slide bar comprises a threaded shaft 48 with two lock nuts 47, one nut positioned on each side of the guide block 34. As shown in FIG. 5, the lock nuts 47 are positionable against either side of the guide block 34, thereby retaining the guide rails 16 in a single preselected position during operation of the conveyor belt 11 without fear that the rails will become more widely separated one from the other. Alternatively, the lock nuts 47 can be positioned on the threaded shaft 48 to act as limit stops so that the guide rails 16 can be quickly and reproducibly moved between a narrower and a wider position without having to accurately measure the distance between the guide rails each time they are so moved.

As illustrated in FIGS. 1–3, the guide rail system of this invention has been shown for a conveyor with a horizontal conveyor path, however, it will be understood that the guide rail system can also be adapted for use with inclined and declined conveyor travel paths. As illustrated in FIGS. 6–8, the horizontal path guide rails 16 are interconnected with inclined path guide rails 49 by rail links 50 pivotally mounted between the inclined path guide rails and the horizontal path guide rails. Posts 51 each with linkage means 20 as described and mounted to the housing 12 as described are provided for maintaining rigidity in the inclined portion of the guide rail system. In FIG. 6 and in the phantom line position of FIG. 7, the guide rail system is shown in its most narrow width configuration. When it is desired to move the guide rails 16, 49 to a greater width configuration the collars 23, 46 are merely rotated so that the horizontal path guide rails move forwardly and outwardly, this movement being transmitted through the rail links 50 to the inclined portion of the guide rail system so that the inclined rails 49 also move forwardly and outwardly an equivalent amount. Of course, the rail links 50 connecting the horizontal path guide rails 16 and the inclined path guide rails 49 assume different geometrical positions, see FIG. 8 versus FIG. 6, for different width guide rail settings.

The preferred embodiment of the invention, as discussed above, has been illustrated with motive means for actuating both guide rails 16 simultaneously. However, the motive means are not absolutely required for varying the distance of each guide rail 16 from its associated support post 21 because each guide rail may be moved or actuated by hand. When a manually actuated guide rail system is desired, in accordance with the principles of this invention the guide rail system essentially comprises the footing means or support posts 21, the linkage means 20, and, for example, one guide rail 16. To vary the distance of the guide rail 16 from its associated support posts 21 the guide rail need merely be grapsed by the hand and moved in a direction which rotates the collars 23, thereby moving the guide rail inwardly or outwardly relative to its associated support post 21 to a preselected position through cooperation of its linkage means 20. Set screws (not shown) or other lock means may be provided for one of the posts 21 to maintain the guide rail 16 in its preselected position. If set screws are used, the set screws are threaded into one of the collars 23 so that they are engageable with one of the posts 21. Thus, to lock the guide rail 16 in its preselected position the set screws in one of the collars 23 need merely be tightened against the post 21. To move the extended length guide rail 16, only one operator is required to loosen the lock means for that one collar and thereafter grasp and move the guide rail to the position desired.

Having described my invention fully, what I desire to claim and protect by Letters Patent is:

1. A guide rail system particularly adapted for use with either gravity or powered conveyor systems comprising at least one guide rail, at least two rail support posts fixed in position relative to the conveyor housing for supporting said guide rail at a position elevated above the conveyor path of said conveyor system, and linkage means interconnecting said guide rail and said posts for permitting the distance between said guide rail and said posts to be varied simultaneously, said linkage means including a collar rotatably mounted to each of at least two said posts, and a collar link mounted integral at one end to each of said collars and pivotally mounted at the other end to said guide rail.

2. A guide rail system as set forth in claim 1 including lock screw means threadably engaged with at least one of said collars for tightening against said post to prevent rotation of said collar relative to said post.

3. A guide rail system as set forth in claim 1 including motive means connected to said linkage means for moving said guide rail away from and toward said posts as desired.

4. A guide rail system as set forth in claim 1 wherein said guide rail includes a guide rail for a horizontal conveyor path and a guide rail for an inclined conveyor path, said paths abutting end-to-end, and a connector link interconnecting said horizontal guide rail with said inclined guide rail, said rail link being pivotally connected to both rails.

References Cited

UNITED STATES PATENTS

| | | | |
|---|---|---|---|
| 635,177 | 10/1899 | McCabe | 198—204 XR |
| 1,012,922 | 12/1911 | Schneider | 198—204 |
| 2,951,574 | 9/1960 | Craig | 198—204 XR |
| 3,292,772 | 12/1966 | Rice | 198—204 |
| 3,313,400 | 4/1967 | Johnson | 198—137 |
| 3,412,873 | 11/1968 | Barker | 193—38 XR |

GERALD M. FORLENZA, Primary Examiner

F. E. WERNER, Assistant Examiner

U.S. Cl. X.R.

193—38